Sept. 14, 1948. T. O. LILLQUIST 2,449,399
GENERATING ELECTRIC TRACTION AND CONTROL SYSTEM
Filed Aug. 21, 1947 2 Sheets-Sheet 1

Inventor
Torsten O. Lillquist
Spencer, Willits, Helmig & Baillie
Attorneys

Patented Sept. 14, 1948

2,449,399

UNITED STATES PATENT OFFICE 2,449,399

GENERATING ELECTRIC TRACTION AND CONTROL SYSTEM

Torsten O. Lillquist, Hinsdale, Ill., assignor to General Motors Corporation, Detroit, Mich., a corporation of Delaware Application August 21, 1947, Serial No. 769,790

12 Claims. (Cl. 290—17)

1

This invention relates to generating electric traction and control systems and more particularly to control means included therein whereby a plurality of such systems may be operated and controlled in multiple.

The principal object of the invention is to provide in a generating electric traction system both manual and automatic control devices which are rendered selectively operable whereby other manually controlled and/or automatically controlled systems of this type may be controlled and operated in multiple therewith.

The combined means included in this system for accomplishing the above object, together with other features provided thereby, will become apparent by reference to the following detailed description and drawings illustrating this combination of means included in a generating electric traction and control system which is particularly adaptable for locomotives of the Diesel electric type.

Figure 1:
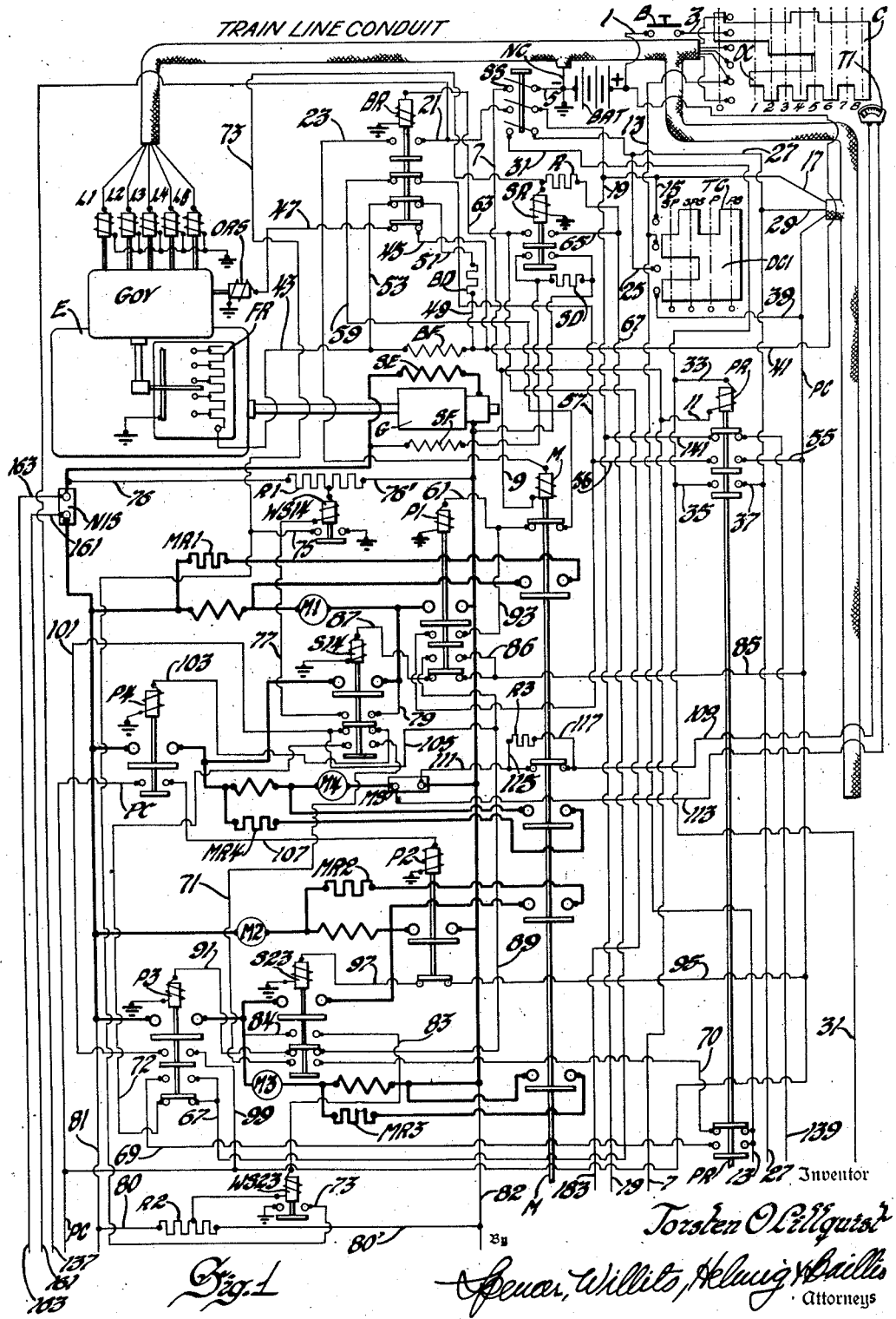
Figure 10:
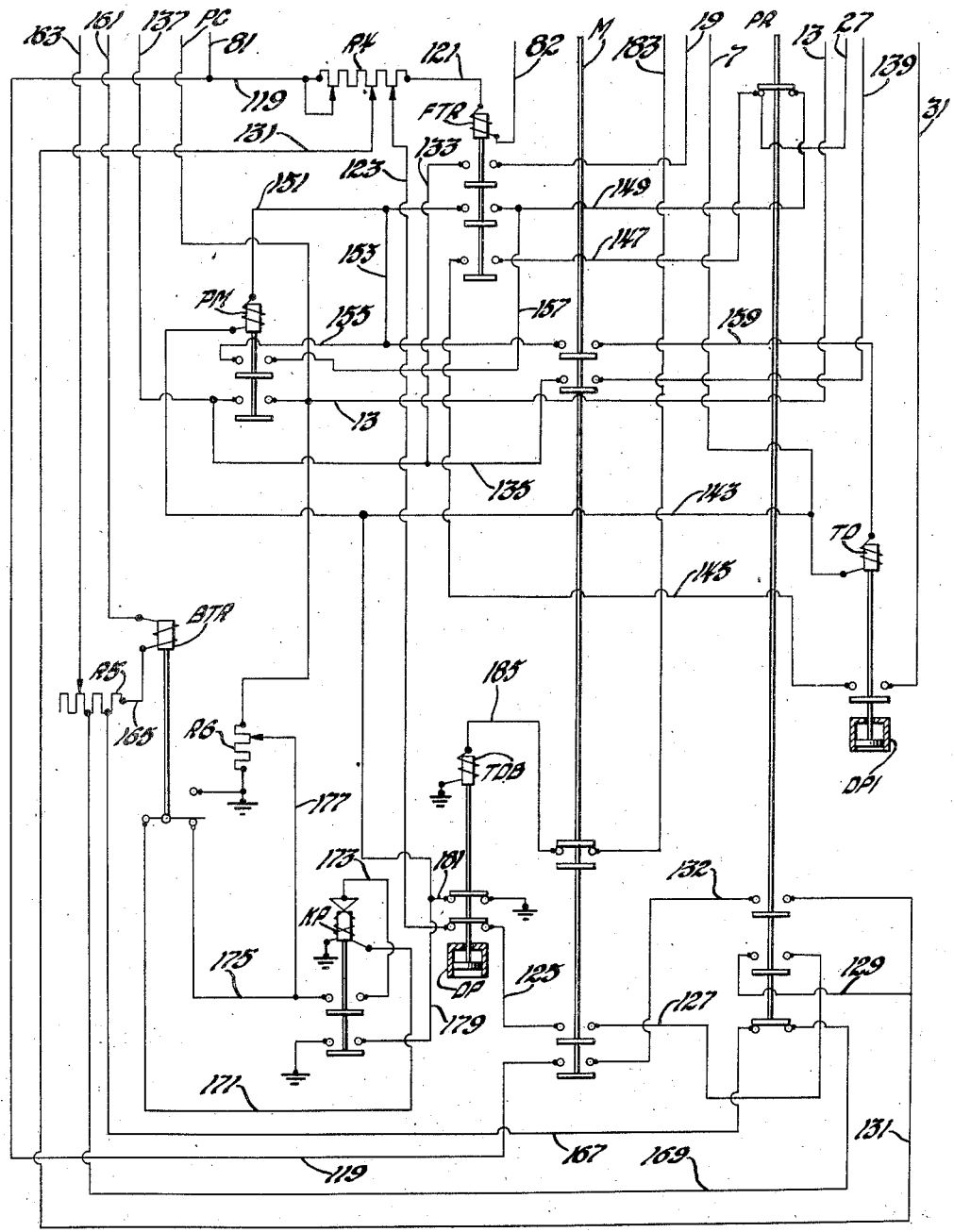

Figure 1 of the drawings is a diagrammatic showing of the traction and manual control means and connections therefor.

Figure 1a of the drawings is a diagrammatic showing of the automatic means and connections with the manual control means shown in Figure 1.

As best illustrated in Figure 1 the generating electric traction system includes a generating electric power plant comprising a Diesel engine E and a compound electric generator G driven thereby and included in an electric power circuit, shown by heavy lines, along with traction motors M1, M2, M3, M4 of the series type which are operatively connected in conventional manner to separate axles, not shown, of the locomotive. Series contactors S14 and S23, parallel contactors P1, P2, P3 and P4, and a motor field shunting contactor M of the electromagnetic type and having stationary contacts connected in the power circuit and contacts movable into contact therewith together with suitable stationary and movable interlocking contacts are provided for properly connecting the traction motors in series-parallel, series-parallel-shunt, parallel and parallel shunt circuit relations with the generator G upon operation of a manually operable master transition controller TC or in response to the operation of automatic transition controlling means to be subsequently described. The motor field shunting resistors MR1, MR2, MR3 and MR4 are connected in separate shunt relation with each of the motor series field windings for both the series-parallel and parallel circuit relations upon closure of the

2 power circuit contacts of the motor field shunting contactor M.

Speed, load and output regulating means are provided for the power plant. This control means includes a governor GOV acting in response to the speed of the powerplant and having electromagnetic means L1, L2, L3, L4 and L5 for changing the speed response thereof so that the governor GOV adjusts the engine fuel rack, not shown, and a generator field rheostat FR to cause operation of the power plant at any one of a plurality of predetermined constant values of speed, load and output in a well known manner by operation of a manually operable master power controller C, shown operably connected by separate train line conductors in a train line conduit with the electro-magnetic speed response controlling means L1, L2, L3, L4 and L5 for the governor GOV and similar means of the governors of other locomotives connected thereto by these train line conductors. The governor GOV is also provided with an overriding solenoid ORS which when energized causes the field rheostat to be automatically moved to reduce the excitation of the generator G and its output to the traction motors.

The generator G is shown provided with a series field winding SE, a shunt field winding SF and a battery excited field winding BF. The shunt and battery fields are energized and deenergized in response to the action of a shunt field relay SR and a battery field relay BR of the electromagnetic type, each having suitable interlocking contacts connected with the above mentioned contactors, master controllers and automatic control means to be described.

The generator shunt field SF is shown connected in series with the normally open lower pair of contacts of the relay SR across the generator armature. A field discharge resistor SD is shown connected across these relay contacts and the shunt field winding.

A battery BAT is provided for energization of the generator battery field winding BF and the various contactors and control relays through train line interlocking and control connections, shown in lighter lines on the drawings, and which will now be described. The positive terminal of the battery BAT is connected by a conductor 1 to one contact of a control switch B, the other contact of which is connected by a conductor 3 to the stationary contact of the master power controller C second from the top. The negative battery terminal is connected to a negative train line control conductor NC and one of the upper contacts of a three pole single throw selector switch SS by a conductor 5. The negative train line control conductor is shown entering a train line conduit which also includes other train line control conductors which are adapted to be connected to identical train line control conductors on other locomotives by suitable connectors, not shown, for multiple control and operation. As most of the contactors and relays and generator battery field winding have one winding terminal connected directly to the negative train line conductor NC, each of these winding terminals and this conductor are shown grounded to indicate a connection to the negative control conductor NC and thereby simplify the drawings.

The other upper contact of the selector switch SS is connected to the negative return winding terminal of the motor field shunting contactor M and a parallel relay PR and certain of the automatic control means by conductors 7, 9 and 11. Each of the other stationary contacts of the master power controller C are shown connected by separate train line conductors with each of the electromagnetic speed response varying means L1, L2, L3, L4 and L5 of the governor GOV. The stationary contact of the manually operable power controller C, second from the bottom, is also connected by a train line conductor 13 shown leading from the train line conduit and a branch conductor with a stationary contact, second from the top, of the manually operable master transition controller TC. The upper stationary contact of the transition controller TC is connected by a conductor 15 to a train line conductor 17 which is connected to a conductor 19. The conductor 19 is shown connected to one of the intermediate contacts of the selector switch SS. The upper normally open contacts of the battery field relay BR are connected by conductors 21—23 in series relation between the other winding terminal of shunting relay M and the other intermediate contact of the selector switch SS. The stationary contact of the transition controller TC, second from the bottom, is connected by a conductor 25 to a conductor 27 shown connected to one of the lower contacts of the selector switch SS and to a train line conductor 29. The other lower contact of the selector switch SS is connected to a conductor 31 which is shown connected by a conductor 33 to the other winding terminal of the parallel relay PR and to one of the normally open pair of contacts of this relay by a conductor 35. The other relay contact of this pair is connected by a conductor 37 to the conductor 27. The lower stationary contact of the transition controller TC is connected by a conductor 39 to a positive train line control conductor PC.

The generator battery field BF and field rheostat FR are connected in series relation by conductors 41—43 between the positive battery terminal and the negative train line control conductor NC. The winding of the governor overriding solenoid ORS and lower normally closed contacts of the battery field relay BR are connected in series relation by conductors 45—47 between the conductor 41 and negative train line control conductor NC. The normally closed contacts, second from the bottom, of the relay BR are connected in series relation with a battery field discharge resistor BD directly across the battery field BF by conductors 49—51—53. The normally closed contacts, second from the top, of the relay BR are connected in series relation with the normally open contacts of the parallel relay PR, second from the top, the normally closed upper contacts of the relay M and the winding of the parallel contactor P1 between the positive and negative train line control conductors PC—NC by means of the conductors 55—56—57—59—61. One terminal of the winding of the relay BR is connected to the negative train line control conductor NC and the other terminal is connected by a conductor 63 to one of the normally open upper pair of contacts of the generator shunt field relay SR. The other relay contact of this pair is connected by a conductor 65 to a conductor 67 which is connected through a resistor R to one winding terminal of the relay SR, the opposite winding terminal of which is connected to the negative train line control conductor. The conductor 67 is also connected to one of each of the two lower pairs of interlocking contacts of the parallel contactor P3, one pair shown normally closed and the other pair shown normally open. The other contact of the normally open pair of contacts of the contactor P3 is connected by a conductor 69 to one of a normally open pair of contacts of the relay PR and the other contact of this pair is connected to the conductor 13. The other contact of the above mentioned normally closed pair of interlocking contacts of the parallel contactor P3 is connected by conductors 70, 71 and 72 in series with the lower normally open contacts of contactors S14 and S23 to one of a normally closed pair of contacts of the relay PR, second from the bottom in Figure 1, the other contact of which is also connected to the conductor 13. Conductors 73—75 connect the junction between the resistor R and one winding terminal of the relay SR to one contact of each of a normally open pair of separate wheel slip relays WS14 and WS23, the other contacts of which are connected to the negative train line control conductor. The winding of the relay WS14 is connected in series relation between the center tap of a resistor R1, shown connected directly across the generator power circuit by conductors 76—76', and one of a normally open upper pair of interlocking contacts of the series contactor S14 by a conductor 77. The other interlocking contact of this contactor is connected by a conductor 79 to the power circuit conductor extending between the parallel contactor P1 and the series contactor S14 serving to connect the motors M1 and M4 in series circuit relation across the generator G power circuit. The winding of the other wheel slip relay WS23 is connected in series relation between the center tap of another resistor R2, likewise shown connected across the generator power circuit by conductors 80—80'—81—82, and one of a normally open upper pair of interlocking contacts of the series contactor S23 by a conductor 83. The other interlocking contact of this contactor is connected by a conductor 84 to the power circuit conductor between the parallel contactor P3 and the series contactor S23 serving to connect the motors M2 and M3 in series circuit relation across the generator power circuit.

Another conductor 85 is connected between the positive train line control conductor PC and one of the lower normally closed pair of interlocking contacts of the contactor P1 and a branch conductor 86 leads from the conductor 85 to one of the normally open intermediate pair of interlocking contacts of the contactor P1. The other contact of this normally closed lower pair of interlocking contacts of the contactor P1 is connected by a conductor 87 to one winding terminal of the series contactor S14, the other terminal of which is connected to the negative train line control conductor NC. The other interlocking contact of the intermediate pair of the contactor P1 is connected by a conductor 89 to one of the normally closed intermediate pair of interlocking contacts of the contactor S23 and the other contact of this pair is connected by a conductor 91 to one winding terminal of the parallel contactor P3, the other terminal of which is connected to the negative train line control conductor NC. The upper normally open pair of interlocking contacts of the parallel contactor P1 are connected in series relation between the conductors 61 and 57 by a conductor 93.

The normally closed interlocking contacts of the contactor P2 are connected in series between the positive train line control conductor PC and one winding terminal of the series contactor S23 by conductors 95—97. The other winding terminal of the contactor S23 is connected to the negative train line control conductor.

The upper normally open pair of interlocking contacts of the parallel contactor P3 and the normally closed intermediate interlocking contacts of the series contactor S14 are connected in series relation between the positive train line control conductor PC and one winding terminal of the parallel contactor P4 by conductors 99—101 and 103. The other winding terminal of the contactor P4 is connected to the negative train line control conductor and a conductor 105 is connected between the conductor 101 and the conductor 89. The positive train line conductor PC is connected to one of the normally open interlocking contacts of the parallel contactor P4 and a conductor 107 is connected between the other interlocking contact and one winding terminal of the parallel contactor P2, the other terminal of which is connected to the negative train line control conductor.

A transition indicator TI is located adjacent the transition controller TC and a normally closed pair of interlocking contacts of the contactor M are connected by conductors 109—111 in series relation between one terminal of the indicator TI and one terminal of a meter shunt MS which is connected in the power circuit in series with the motor M4. The other terminal of the shunt MS and the indicator TI are connected by a conductor 113. The indicator accordingly indicates the voltage drop across the shunt or current flowing through the motor M4 and the dial is calibrated to indicate proper current values for making transition between the various motor circuit relations. A resistor R3 for the transition indicator TI is shown connected directly across the above mentioned normally closed contacts of the contactor M by conductors 115—117 to change the calibration of the transition indicator.

The automatic transition control means, shown in Fig. 1a, includes a forward transition relay FTR which acts in response to the voltage of the generator G to control forward transition of the traction motor connections and the shunting of the motor field windings. The winding of the relay FTR is connected in series with a tapped resistor R4 directly across the generator power circuit by means of conductors 119—121 and the conductors 81—82. The lower normally closed contacts of a time delay relay TDB for controlling backward transition, one pair of normally open contacts of the contactor M, second from the bottom, and one pair of normally open contacts of the parallel relay PR, second from the bottom, are connected in series relation between adjacent taps of the resistor R4 by conductors 123—125— 121—129 and 131. The lower contacts of the contactor M and the contacts, third from the bottom, of the relay PR are connected in series relation between the conductors 119 and 131 by a conductor 132. It will be noted that the time delay relay TDB is provided with a dashpot and plunger DP to delay upward closing movement of the armature upon energization of the relay winding. The upper normally open contacts of the relay FTR are connected in series relation between the conductor 19 and a conductor 133 shown connected to one of each of a normally open pair of contacts of the contactor M and a relay PM for the M contactor by a conductor 135. A conductor 137 is connected between the conductor 135 and the conductor 21 shown in Figure 1. The other contact of the above mentioned normally open pair of contacts of the relay PM is connected to the conductor 13 which, as shown in Figure 1a, is also connected to the positive train line control conductor PC. The other contact of the above mentioned normally open pair of contacts of the contactor M is connected in series relation with the normally closed upper pair of contacts of the parallel relay PR by conductors 139—141 to the conductor 19 shown in Figure 1. The conductor 7 serving as a negative return conductor for the contactor M and relay PR is also connected to the return winding terminal of a time delay relay TD and by a branch conductor 143 to the return winding terminal of the relay PM. The normally open pair of contacts of the time delay relay TD and the normally open lower pair of contacts of the relay FTR are connected in series by conductors 31—145—147 to one of the normally closed pair of contacts of the relay PR, shown at the top of Figure 1a, and also to the conductor 27. The time delay relay TD is provided with a dashpot and plunger DP1 for delaying upward closing movement of the armature upon energization of the relay winding. The normally open intermediate pair of contacts of the relay FTR are connected in series relation by conductors 149—151 between the other contact of the above mentioned normally closed pair of contacts of the relay PR and the other winding terminal of the relay PM. The normally open upper pair of contacts of the relay PM are connected by conductors 153—155—157 between the conductors 149—151 and therefore in shunt relation with the normally open intermediate contacts of the relay FTR. One pair of normally open contacts of the contactor M is shown connected in series between the conductor 155 and the other winding terminal of the time delay relay TD by a conductor 159.

Automatic backward transition of the traction motor connections and the shunting of the motor field windings is controlled by a backward transition relay BTR acting in response to variations in the generator current and by operation of the time delay relay TDB and a relay KP. The winding of the backward transition relay BTR is connected in series with a tapped resistor R5 across the terminals of a non-inductive shunt NIS by conductors 161—163—165. The shunt NIS is in series circuit relation with one of the main generator power conductors shown in Figure 1. The armature of the relay BTR is pivotally connected to a pivoted armature which is normally engaged with a lower stationary contact and is upwardly movable into engagement with an upper stationary contact upon energization of the winding. Adjacent taps of the tapped resistor R5 are connected across the normally closed lower contacts of the parallel relay PR by conductors 167—169

The pivoted arm of the relay BTR is connected by a conductor 171 to a terminal of one winding of the relay KP, the opposite terminal of this winding is directly connected to a terminal of another similar winding, the opposite terminal of which is connected to the negative control conductor NC. The upper normally open pair of contacts of the relay KP are connected in series between the directly connected terminals of the two windings and the lower contact of the relay BTR, on which the arm of the relay normally contacts, by means of the conductors 173—175. A tapped resistor R6 is connected in series between the positive control conductor PC and the upper stationary contact of the relay BTR, which contact is also connected to the negative control conductor NC. The tap of the resistor R6 is connected by a conductor 177 to the conductor 175. The normally open lower pair of contacts of the relay KP are connected in series between the conductor 143 and the negative control conductor by a conductor 179. The normally closed upper contacts of the relay TDB are connected in series between the conductor 179 and the negative control conductor by a conductor 181. One pair of normally closed contacts of the contactor M are connected in series between the conductor 63, shown in Figure 1, and one winding terminal of the relay TDB by conductors 183—185. The other winding terminal of this relay is connected to the negative control conductor.

Manual control and operation

In order to provide manual control of the locomotive, the control switch B is closed, the selector switch SS is moved to the closed or manual control position, conventional reversing means, not shown, is provided to select forward or reverse drive of the traction motors, the drum DC of the power controller is moved to the engine idling control position 1 to bridge the stationary contacts second from the bottom and top and the transition controller drum DC1 is moved to the series-parallel position SP to bridge the contact second from the top and the bottom contact thereof. This connects the positive terminal of the battery BAT through conductors 1—3—13—39 to the positive control conductor PC. This completes a circuit from the conductor PC through the closed lower interlocking contacts of the parallel contactor P1 and conductors 85—87 to one winding terminal of the series contactor S14 and also connected through the closed lower interlocking contacts of the parallel contactor P2 and conductors 95—97 to one winding terminal of the series contactor S23, as the other winding terminals of the contactors S14—S23 are connected to the negative control conductor NC. This causes closure of the upper power contacts of the contactors S14—S23, to cause each pair of motors to be connected in series across the generator or in series parallel relation therewith, and also the closure of the upper and lower and the opening of the intermediate interlocking contacts of the series contactors. Closure of the upper interlocking contacts connects each of the wheel slip relays WS14 and WS23 between the motors of each pair and the center tap of one of the resistors R1—R2 across the generator. Closure of the lower interlocking contacts of the series contactors S14—S23 completes a circuit through these contacts, the closed contacts of the parallel relay PR, second from the bottom shown in Figure 1, the lower interlocking contacts of the parallel contactor P3, the resistor R and winding of the shunt relay SR and conductors 13—70—71—72—67 and NC to cause closure of the upper and lower contacts of this relay. Closure of the lower contacts of the relay SR shunts out the discharge resistor SD, connected across the generator shunt field winding SF and energization thereof.

Closure of the upper contacts of the shunt relay SR completes a circuit from the conductor 67 through these contacts, conductors 63—65, and through the winding of the generator battery field relay BR to the negative train line conductor. This causes energization of the winding of the relay BR and closure of the upper two pairs and the opening of the lower two pairs of this relay, only when the shunt field relay SR is energized and the contacts close. The opening of the lower pair of contacts of the relay BR breaks the circuit connection comprising the conductors 45—47 to the overriding solenoid ORS of the governor. The opening of the contacts second from the bottom of the relay BR opens the shunt connection across of the generator battery field winding BF, which connection includes the conductors 49—51—53 and the battery field discharge resistor BD, to cause energization of the battery field winding by the battery BAT through conductors 41—43, the field rheostat FR and conductor NC. The closure of the contacts of the relay BR second from the top sets up a circuit connection comprising conductors 55—57—59—61 including the normally open pair of contacts second from the top of the parallel relay PR and the normally closed upper contacts of the contactor M to the winding of the parallel contactor P1.

The traction motors M1—M2—M3—M4 are accordingly connected in series parallel circuit relation with the generator G whose shunt and battery field windings SF—BF are energized but as the engine E is operating at idling speed there is not sufficient power output from the generator to drive the motors until the power controller C is moved between positions 1 and 8 to increase the speed response of the governor GOV and the speed, load and output of the engine and generator to the traction motors.

Manual forward transition between series-parallel and series-parallel-shunt motor circuit relations Upon an increase in speed of the locomotive to 19 miles per hour the speed and back voltage of the motors increase to reduce the generator current and motor torque. Upon a decrease in current to a given value corresponding to a speed of 19 miles an hour, as indicated on the transition indicator TI, which is connected by conductors 109—111—113 in series with a resistor R3, normally shunted by a pair of closed interlocking contacts of the contactor M and conductors 115—117, across the meter shunt MS in series with the power conductor of the motor M4, the transition controller drum contact is moved to the series-parallel-shunt position SPS to connect each of the motor field shunting resistors MR1—MR2—MR3—MR4 in shunt relation with the respective motor series field winding to reduce the field excitation current and thereby decrease the back voltage and increase the generator current supplied to the motors and increase the speed thereof. When the transition controller drum contact is in the series-parallel shunt position it contacts the upper stationary controller contact and completes an energizing circuit to the winding of the motor field shunting contactor and causes the opening thereof and the insertion of shunting resistors across the motor field windings and also causes the opening of the pair of closed contacts mentioned above to insert the resistor R3 in series with the transition indicator TI to reduce the current indicated thereby upon the resulting rise in current applied to the motors and indicator. The energizing circuit of the winding of the contactor M included the closed upper and intermediate poles of the selector switch SS and the now closed upper contacts of the relay BR and the train line conductors 13—17 and conductors 15—19—21—23—9—7 and negative train line conductor NC.

*Anti-wheel slip control with motors in series-parallel or series-parallel-shunt circuit relations*

It will be noted that with the motors in series-parallel or series-parallel-shunt circuit relation that each of the windings of the wheel slip relays is connected between the center tap of one of the resistors R1—R2, each of which is connected across the generator, and through a pair of interlocking contacts which are now closed to a point between each pair of series connected traction motors. As long as the wheels driven by each motor of a series connected pair rotate at equal speed no current will flow through the winding of either wheel slip relay but if the wheels driven by one motor of either pair slip circulating current will flow through the wheel slip relay winding connected between a series connected pair of motors to cause closure of the contacts thereof to shunt the winding of the shunt relay SR and its armature will fall to the normal position shown. This causes deenergization of the winding of the battery field relay BR and its armature likewise falls to the normal position shown. The falling of the armatures of the shunt and battery relays inserts the discharge resistors SD and BD in the generator shunt and battery field windings, causes energization of the governor overriding solenoid ORS to cause movement of the field rheostat FR in the battery field circuit so that the generator excitation and power output to the motors is promptly reduced to check slippage of the wheels driven by any traction motor. The winding of the motor field shunting contactor M is also deenergized by the dropping out of the armature of the relay SR when the motors are connected in series-parallel-shunt relation to further check wheel slippage. When the speed of the wheels driven by each of the motors is balanced the armatures of the wheel slip relay are again deenergized and their armatures drop out to restore the generator excitation and power output to its original value as determined by the position of the power controller C.

*Manual forward transition between series-parallel-shunt and parallel motor circuit relations*

The increase in speed of the locomotive to twenty-five miles per hour and motors when connected in series-parallel-shunt relation with the generator causes an increase in the motor back voltage and a decrease in the generator current supplied to the motors. At a given value of current, corresponding to a speed of twenty-five miles per hour, as now indicated by the transition indicator TI with the resistor R3 in series therewith the transition controller is moved from the series-parallel-shunt position SPS to the parallel position P to cause forward transition between the series-parallel connection and parallel connection to further decrease the motor back voltage in order to further increase the current supplied the motors and their torque and speed. Movement of the transition controller drum to the parallel position P causes it to move out of contact with the upper stationary controller contact and into contact with the stationary controller contact second from the bottom. The opening of the upper controller contact opens the energizing connection to the winding of the motor field shunting contactor M and its armature falls to the normal position, shown, thereby to again shunt out the motor field shunting resistors MR1—MR2—MR3—MR4 and the resistor R3 in series with the transition indicator TI. The closing of the controller contact, second from the bottom, completes an energizing circuit through conductors 25—27—31—33—11—7—5—NC and the winding of the parallel relay PR which causes the opening of the upper contacts and the contacts, second from the bottom, and the closure of the other contacts of this relay shown in Figure 1. The closure of the contacts third from the top of the relay PR establishes an energizing holding circuit to the winding comprising conductors 27—37—35—31. The opening of the lower contacts of the relay PR, shown in Figure 1, opens the energizing circuit to the winding of the shunt field relay SR and its armature falls to the normal position to insert the discharge resistor SD across the generator shunt field and to break the energizing connection to the winding of the battery field relay BR which causes its armature to fall to the position shown to insert the discharge resistor BD across the generator battery field BF and to establish an energization circuit through the lower relay contacts and conductors PC—41—45—47—NC to the governor overriding solenoid ORS to cause the governor GOV to move the field rheostat FR to decrease the current in the generator battery field BF and to also cause energization of the winding of the parallel contactor P1 through the closed contacts of the relay BR, second from the top, and the now closed contacts of the parallel relay PR, second from the top, and the upper contacts of the contactor M and conductors PC—55—56—57—59—61. The generator output to the traction motors is reduced at this time as the discharge resistors SD—BD are connected across the generator shunt and battery fields SF—BF and the resistance of field rheostat FR is increased by the governor GOV to the maximum resistance value in response to action of the energized overriding solenoid ORS. Energization of the winding of the parallel contactor P1 causes closure of the power contacts to connect the motor M1 in parallel with the generator and the opening of the lower interlocking contacts and closure of the upper and intermediate interlocking contacts of the contactor P1. Opening of the lower interlocking contacts opens the energization circuit comprising conductors PC—85—87 to the winding of the series contactor S14 which causes its armature to fall to the normal position shown. Closure of the intermediate interlocking contacts of the contactor P1 establishes energizing circuits to the winding of the parallel contactor P4. The energization circuit of the winding of the contactor P4 includes conductors PC—85—86—89—105—103 and the closed lower interlocking contacts of the series contactor S14, when the armature thereof falls to the normal position shown. Energization of the winding of the contactor P4 causes closure of the power contacts, to connect the motor M4 across the generator, and also the closure of the interlocking contacts to establish an energization circuit through the conductors PC—107 to the winding of the parallel contactor P2 to cause closure of the power contacts which connects the motor M2 across the generator and also the opening of the interlocking contacts which deenergizes the winding of the series contactor S23 and causes its armature to fall to the position shown with the lower interlocking contacts closed. The closing of these lower interlocking contacts of the contactor S23 establishes an energizing circuit including conductors 89—91 to the winding of the parallel contactor P3. This causes closure of the power contacts of the contactor P3 to connect the remaining motor P3 across the generator and the closure of the upper and intermediate interlocking contacts. Closure of the upper interlocking contacts establishes an energizing holding circuit through conductors PC—101—103 and the lower interlocking contacts of the contactor S14 to the winding of the parallel contactor P4. Closure of the intermediate interlocking contacts of the contactor P3 reestablishes the above described energization circuit to the winding of the shunt field relay SR and closure of its contacts which again causes deenergization of the overriding solenoid ORS and energization of the winding and closure of the battery field relay BR as described previously to again cause reexcitation of the battery and shunt fields of the generator G and power output to the traction motors M1—M2—M3—M4 which are now connected in parallel with the generator.

*Manual forward transition between parallel and parallel-shunt motor circuit relations*

When the speed of the locomotive reaches fifty-two miles per hour and the speed of the parallel connected motors increase to a value causing a decrease in the generator current to a preselected value, as indicated by the transition indicator TI, the transition controller drum DC1 is moved to the parallel-shunt position which again reestablishes the energizing circuit to the motor field shunting contactor M and causes the shunting of the motor field windings to cause an increase in the current and torque thereof in order to obtain maximum speed of the locomotive upon the movement of the power controller to position 8 to cause operation of the engine and generator at the maximum value of speed, load and power output.

The foregoing changes in the motor connections are for increasing speeds of the traction motors and locomotive and are referred to as forward transition of these connections.

For decreasing speeds of the motors and locomotive upon increasing loads, an opposite change in the motor connections will be referred to as backward transition of these connections, which will now be described.

*Manual backward transition between parallel-shunt and parallel motor circuit relations*

With the motors in the parallel-shunt circuit relation, upon an increase in load, the speed of the motors and locomotive will decrease and cause a decrease in the motor back voltage and an increase in the current supplied to the parallel connected motors. When the load current increases to a preselected value, corresponding to a speed of forty-five miles per hour as indicated on the transition indicator, the transition controller is moved back from the parallel-shunt to the parallel position. This causes deenergization of the motor field shunting contactor winding and its armature will fall to the normal position, shown, to shunt the resistor R3 in series with the transition indicator TI, motor field shunting resistors MR1—MR2—MR3—MR4 and restore full excitation current to the fields to cause an increase in the back voltage and a reduction in current supplied to the motors and a reduction in their torque output.

*Manual backward transition between parallel and series-parallel-shunt motor circuit relations*

Upon a further increase in the motor load current corresponding to a decrease in speed to twenty-three miles per hour, as indicated by the transition indicator, the transition controller TC requires movement thereof to the series-parallel-shunt position or a backward movement of the power controller C to prevent overloading of the generator G. When the controller TC is moved backward to the series-parallel-shunt position the energizing circuit comprising the conductors 25—27—31—33 to the winding of the parallel relay PR is broken and its armature falls to the normal position shown. This breaks the energizing circuit comprising the circuit connections 13—87 from the lower contacts of the relay PR, shown on Figure 1, to deenergize the winding of the shunt relay SR and its armature falls to the normal position to deenergize the winding of the battery field relay BR to cause its armature to also fall to the normal position to again cause a reduction in the generator output in the same manner as previously described. The falling of the armature of the relay PR to the normal position also breaks the energizing connection from the contacts of this relay, second from the top, to the winding of the parallel contactor P1 and it falls to the normal position to disconnect the motor M from the power circuit and reestablishes the circuit from the lower pair of interlocking contacts to the winding of the series contactor S14 causing closure of its power and intermediate interlocking contacts and the opening of the lower interlocking contacts to deenergize the winding of the parallel contactor P4 and its armature falls to the normal position to cause the motors M1 and M2 to be connected in series across the generator G. With the armature of the contactor P4 in normal position the lower interlocking contacts are opened and cause deenergization of the winding of the parallel contactor P2 and it falls to the normal position to disconnect the motor P2 and cause reenergization of the winding of the series contactor S23, causing closure of the power and upper interlocking contacts and the opening of the lower interlocking contacts to cause deenergization of the winding of the parallel contactor P3. This causes the motors M2—M3 to then be connected in series across the generator G and in parallel with the motors M1—M4. With the parallel contactor P3 in the normal position the lower interlocking contacts close and as the lower interlocking contacts of the series contactors S14—S23 are now closed this causes reenergization of the winding and closure of the contacts of the shunt field relay SR which again causes reenergization of the winding and closure of certain of the battery field relay contacts BR in the same manner as previously described to cause reenergization of the winding and closure of certain contacts of the field shunting contactor M thereby increasing the excitation and power output of the generator to the motors which are now connected in series-parallel-shunt circuit relation with the generator G.

*Manual backward transition between series-parallel-shunt and series-parallel motor circuit relations*

With the motors so connected upon an increase in the current supplied thereto to a given value, as indicated by the transition indicator TI, upon an increase in load and a decrease in the speed of the motors, the transition controller is moved back to the series-parallel position or the power controller C is moved back to reduce the generator output to prevent overloading of the motors. Upon further increase in the load current to a value indicated on the indicator the transition controller TC is moved back to the series-parallel position to deenergize the winding of the motor field shunting contactor M and shunt the motor field shunting resistors. The motors are then connected in series-parallel relation with the generator and the power controller C is moved back to reduce the current applied thereto and prevent overloading thereof.

*Automatic transition*

The automatic means described for causing automatic forward and backward transition of the above motor connection is rendered effective by opening the selector switch SS and placing the drum DC1 of the transition controller in the parallel-shunt position. As will be subsequently described any undesired forward step of transition can be forestalled beyond the position in which the drum DC1 is placed. With the transition controller TC in the parallel-shunt position PS movement of the power controller C between the idle position 1 and maximum power output position causes automatic forward transition of the traction motor circuit relations in response to variations in the voltage of the generator G and automatic backward transition in response to variations in the generator voltage and load current in the following manner. The energization of the windings of the shunt and battery field relays SR—BR and series contactors S14—S23 takes place through the same connections as previously described and they operate in the same manner to excite the generator G and to connect the motors M1—M2—M3—M4 in series-parallel circuit relation with the generator to cause starting and acceleration of the locomotive upon operation of the power controller C to increase the power delivered to the motors from the generator.

*Automatic forward transition between series-parallel and series-parallel-shunt circuit relations*

When the power controller C is moved to any position between 1 and 8 the two windings of the relay KP are energized through conductors 13—PC, the tap of the resistor R6, conductors 177—175—173 and NC and the normally closed contacts of the backward transition relay BTR and the upper and lower contacts of the relay KP close. Closure of the upper relay contacts establishes an energizing holding circuit comprising conductors 175—173 to one winding of the relay KP and closure of the lower contacts sets up a negative return circuit from the negative train line control conductor NC and conductors 179—143—7—11—9 to the windings of the relays PM—TD—PR, and the contactor M. When the speed of the locomotive increases to nineteen miles per hour and the voltage of the generator G increases to a value of 930 volts the current flowing through the resistor R4 and the winding of the forward transition relay FTR, connected in series across the generator by conductors 81—119—121—82, causes closure of the contacts of the relay FTR. Closure of the upper contacts establishes an energizing connection 15—19—133—135—137—21, the closed upper contacts of the relay BR and conductors 23 and NC to the winding of the contactor M to cause the motor field shunting resistors MR1—MR2—MR3—MR4 to be shunted across the respective motor field windings and thereby automatically establish the series-parallel-shunt motor connection to the generator G. The contacts of the contactor M, second from the top, as shown in Figure 1a are also closed to establish an energizing holding connection to the winding of the contactor M through the conductors 139 to the conductor 19. An energizing connection is also established to the winding of the relay PM through the closed intermediate contacts of the relay FTR and the closed contacts of the relay second from the top, shown in Figure 1a and conductors 27—149—151 and previously mentioned negative return connection set up through the closed lower contacts of the relay KP. This causes closure of the upper and lower contacts of the relay PM. Closure of the upper contacts of the relay PM establishes a holding circuit to the winding comprising conductors 153—155—157 between conductors 149—151 and an energizing circuit through the upper closed contacts of the contactor M, shown in Figure 1a, and conductors 155—159 to the winding of the time delay relay TD and the negative return circuit previously mentioned. The plunger and dashpot DP1 of the time delay relay TD delays closure of the contacts for six seconds upon energization of the winding to prevent opening of the contacts of the forward transition relay FTR upon shunting of the motor fields which causes a reduction in voltage across the winding to between 860—900 volts and the armature of the relay FTR then drops to the normal position. This occurs prior to the delayed closure of the contacts of the time delay relay to prevent energization of the winding of the parallel relay PR which is connected in series with the contacts of the time delay relay TD and the lower contacts of the forward transition relay FTR by conductors 33—31—145—147—27. The time delay backward transition relay TDB is also provided with a plunger and dashpot DP and the relay winding is connected in series by conductors 63—183—185 with the stationary contacts of the contactor M, third from the bottom, which are closed when the contactor winding is deenergized and when energized, and also with the upper contacts of the relay SR and the resistor R7, so that the winding of the relay TDB is energized when the contacts of the relay SR are closed and when the contacts second from the bottom of the contactor M are closed. The plunger and dashpot of the relay TDB delays opening of the relay contacts for fifteen seconds but these contacts open momentarily upon upward or downward movement of the armature of the contactor M during the time the contacts second from the bottom of this contactor are momentarily opened.

*Automatic forward transition between series-parallel-shunt and parallel motor circuit relations*

With the motors connected in series-parallelshunt circuit relation with the generator, when the speed of the locomotive increases to twenty-five miles per hour the generator voltage will again increase to 930 volts causing reclosure of the forward transition relay FTR and the reclosure of the lower contacts thereof to establish an energizing circuit to the winding of the parallel relay PR through the closed contacts of the time delay relay TD and conductors 147—145 and 31. This causes the armature of the parallel relay to rise and cause a reduction in the generator output and transition of the motor connections from the series-parallel-shunt to the parallel circuit relation in a similar manner to that described by operation of the manually operable transition controller. The reduction in the generator output and voltage during transition causes the relay FTR to open and as the winding of the relay PR is energized the upper and lower contacts of this relay, shown in Figure 1a, are opened and the two intermediate contacts are closed. With the lower contacts of the relay PR open the portion of the resistor R5 between the taps connected therewith by conductors 167—169 is inserted in series with the winding of relay BTR. As the winding of the contactor M is deenergized during transition the contacts thereof are in the position shown in Figure 1a. After transition of the motor connections from the series-parallel-shunt to the parallel connection the reclosure of the relay SR causes energization of the relay TDB causing the opening of the two lower contacts thereof after a fifteen second delay. The opening of the upper contacts of the relay TDB opens the negative return connection from the conductor 179 but this return connection is maintained through the lower closed contacts of the energized relay KP.

*Automatic forward transition between parallel and parallel-shunt relations*

Forward transition between the parallel and parallel-shunt motor connections is accomplished automatically when the speed of the locomotive increases to fifty-two miles per hour and the generator voltage again increases to 930 volts to again cause closure of the contacts of the relay FTR and energization of the winding and operation of the contactor M to shunt the traction motor fields and establish the parallel-shunt motor connection and to short out a portion of the resistance in the resistor R4 in series with the winding of the relay FTR through the two closed lower contacts of the contactor M and the two closed contacts second and third from the bottom of the relay PR, and the closed lower contacts of the relay TDB and the conductors 119—132—131—123—125—127—129. This reduces the drop out voltage of the relay FTR to 580 volts which is above the generator voltage when the traction motor fields are shunted with the motors connected in parallel relation. The relay contacts FTR accordingly remain closed and the winding of the relay TDB is again energized by closure of the contacts third from the bottom of the contactor M to cause the reopening of the two lower contacts of the relay TDB fifteen seconds later. Opening of the lower contacts of the relay TDB opens the shunt connection across a portion of the resistor R4 to increase the resistance in series with the winding of the relay FRT to increase its drop out voltage to 675 volts after build-up of the generator voltage upon the establishment of the parallel-shunt motor connection, thereby preventing drop out of the armature of the relay FTR.

*Manual forestalling of automatic forward transition*

As previously mentioned the transition controller is moved to the parallel-shunt position to obtain forward automatic transition of the motor connections between series-parallel, series-parallel-shunt, parallel and parallel-shunt relations. Under some operating conditions it is desirable to forestall automatic forward transition to any one of these relations, such as a levelling off of an upgrade for a short distance only which would cause automatic forward transition followed immediately by an automatic backward transition between two circuit relations. To forestall forward automatic transition between any motor circuit relation, when the transition controller is placed in any control position, automatic forward transition cannot take place beyond this controller position selected as an energizing connection from the upper contact of the controller is completed through the upper contacts of the forward transition relay FTR to the winding of the motor field shunting contactor M and another energizing connection is established through the contact of the controller, second from the bottom, through the lower contacts of the relay FTR and the contacts of the time delay relay TD to the winding of the parallel relay PR.

*Automatic backward transition between parallel-shunt and parallel motor circuit relations*

With the motors now in the parallel-shunt circuit relation and the locomotive operating at a speed above fifty-two miles per hour should the load increase and the speed fall to forty-five miles per hour, the generator voltage will decrease to 675 volts, which is the drop out value of the forward transition relay FTR and its armature will fall to the normal position shown in Figure 1a. This causes deenergization of the windings of the relays PM—TD and their armatures fall to the normal position and also causes deenergization of the winding of the contactor M and its armature to fall to the normal position to reestablish the parallel motor circuit relation. The momentary opening of the stationary contacts of the contactor M, third from the bottom of Figure 1a, causes momentary deenergization of the winding of the relay TDB to cause its armature to fall to the normal position and be delayed in reclosing for fifteen seconds as described.

*Automatic backward transition between parallel and series-parallel-shunt motor circuit relations*

With the motors connected in parallel an increase in the load current to 2100 amperes corresponding to a reduction in speed to twenty-three miles an hour causes the closure of the upper and the opening of the lower contacts of the backward transition relay BTR as the winding thereof is connected in series with only a portion of the resistor R5 across the shunt NIS in the generator power circuit. The other portion of the resistor R5 is then shunted by the lower closed contacts of the parallel relay PR. With the armature of the relay BTR in contact with its upper stationary contact an energizing circuit is established from the positive train line conductor PC to both of the windings of the relay KP in differential series circuit relation which causes its armature to drop to the normal position opening the lower contacts thereof. This opens the negative return connection from the winding of the parallel relay PR and its armature falls to the normal position. As described above with reference to backward transition between the parallel and series-parallel-shunt relation upon operation of the transition controller TC this causes the following sequence of operation of the contactors and relays. The dropping of the armature of the parallel relay PR causes the dropping of the armatures of the relays SR and BR and TDB. This causes energization of the overriding solenoid OPS of the governor and connection of the discharge resistor across the generator shunt and battery field windings to reduce the generator output and also causes drop out of the parallel contactor P1. Drop out of the contactor P1 causes closure of the series contactor S14 and this causes the opening of the parallel contactor P4 which causes the opening of contactor P2. The opening of the contactor P2 causes closure of the series contactor 23 which causes the opening of the parallel contactor P3. The opening of the contactor P3 and reclosure of the series contactors S14—S23 causes reclosure of the generator shunt and battery relays SP—BR and the relay TDB to cause an increase in the generator output to the traction motors which are now connected in series-parallel with the generator causing a reduction in the current generated to a value below 1300 amperes, the drop out value of the backward transition relay BTR and a normal increase in the generator voltage necessary to cause closure of the forward transition relay FTR as previously explained. The dropping of the relay BTR and closure of the relay FTR again completes an energizing circuit for the winding of the contactor M and it closes to establish a holding circuit for its winding and causes drop out of the relay TDB to establish an additional negative return circuit from the winding of the contactor M if a surge of generator current should occur during this transition and cause closure of the relay BTR and the opening of the relay KP. Also as previously explained, the relay PR is again prevented from closing as the upper contacts of relay FTR open before the contacts of the time delay relay TD are delayed in closing for six seconds. The motors are now connected in series-parallel-shunt relation with the generator, the relays PM, TD, BTR and TDB are closed and the relays PR and FTR are open and the locomotive is operating at less than twenty-three miles per hour. It should be pointed out here that before the contactor M closes the motors are connected in series-parallel with the generator and will remain in this relation if the generator voltage does not pick up to 930 volts corresponding to a speed of nineteen miles per hour due to a rapid increase in load on and deceleration of the locomotive.

*Automatic backward transition between series-parallel-shunt and series-parallel motor circuit relations*

With the motors in series-parallel-shunt circuit relation when the speed falls to eighteen miles per hour and the generator current rises to 1500 amperes, the new pickup value of the relay BTR, as the lower contacts of the parallel relay now short out a portion of the resistance R5 in series with the winding of the relay BTR, the relay will reclose to again cause drop out of the relay KP and cause opening of the negative return connection from the winding of the contactor M and it will drop out and shunt the motor field shunting resistors MR1—MR2—MR3—MR4 to establish the series-parallel motor connection with the locomotive operating at less than eighteen miles per hour.

*Multiple control*

The train line control connections provided enable other locomotive units having similar manually operable master power and transition controllers, or power controllers and automatic transition control means to be connected in multiple for control and operation in multiple from the power and transition controllers of any locomotive unit or from any locomotive unit having only a power controller and automatic transition controlling means.

I claim:

1. A generating electric traction and control system comprising power generating plant, output control means therefor, traction motors, means for connecting said motors in different power circuit relations with said power plant, interlocking and control connections including manually operable and automatic control means between said motor connecting means and said output control means for causing a reduction in power supplied to said motors during a change in the motor connections, said automatic control means acting in response to electrical conditions in each motor circuit connection, and means operable manually for rendering said manual control means solely effective or effective in combination with said automatic control means to forestall operation of said motor connecting means by said automatic control means.

2. A generating electric traction and control system comprising power generating plant, output control means therefor, traction motors, means for connecting said motors in different power circuit relations with said power plant, interlocking and control connections including manually operable and automatic control means between said motor connecting means and said output control means for causing a reduction in power supplied to said motors during a change in the motor connections, said automatic control means acting in response to electrical conditions in each motor circuit connection, and means operable manually for rendering said manual control means solely effective or effective in combination with said automatic control means to forestall operation of said motor connecting means by said automatic control means in response to the electrical conditions in certain of said motor circuit relations.

3. A generating electric traction and control system comprising a power plant, output varying means therefor, power connections from said power plant including traction motors and switching means for transferring the motor connections with respect to said power plant, interlocking and control means and connections between said output varying means and said switching means for causing a reduction in the output of said power plant during transfer of said motor power circuit connections, said interlocking and control means and connections including manually operable and automatic transition control means for said output varying means and said switching means, said automatic transition control means being operable in response to variations in electrical conditions in said power circuit connections, and manually operable means for rendering said manually operable transition control means effective and for rendering said automatic and said manual transition control means effective, said manual transition control means then serving to forestall control of said power plant output varying means and said switching means by said automatic transition control means for certain electrical conditions in said power connections.

4. A generating electric traction and control system for a locomotive comprising traction motors for driving the locomotive, excitation reducing means for said motors, a power plant for said motors, output varying means for said power plant, power connections including switching means for transferring the power connections of said motors with respect to said power plant, control and interlocking means and connections between said motor excitation reducing means, said power plant output varying means, and said switching means to cause combined and sequential operation thereof for causing reduction in the power plant output during transition of the motor power connections and operation of said motor excitation reducing means for each motor power connection, said control and interlocking means and connections including manual operable and automatic control means for controlling the above described combined and sequential operation, said automatic means acting in response to the electrical conditions in the power connections, and manual means for rendering only said manual transition means effective and for rendering said automatic means effective and for rendering said manual transition effective to forestall certain of the above described combined and sequential operations upon operation of said automatic transition control means.

5. A generating electric traction and control system for a locomotive comprising traction motors for driving the locomotive, motor excitation reducing means, a power plant for said motors, power plant output varying means, power connections including switching means for causing transition of the motor power connections between different power circuit relations with said power plant, control, interlocking and train line connections between said motor excitation reducing means, said power plant output varying means and said switching means to cause combined and sequential operations thereof for causing a reduction in the output of said power plant during transition of the motor power circuit relations and a reduction in the motor excitation for each power circuit relation, said control, interlocking and train line control connections including a manually operable master power output controller, a manually operable master motor transition controller and automatic motor transition control means operable in response to electrical conditions in said motor power circuit relations, and a manually operable selector switch for rendering only said master transition controller effective for controlling said above described combined and sequential operations and for rendering the automatic transition control means effective for controlling said operations and at the same time rendering said master transition controller effective for forestalling certain of said operations.

6. A generating electric traction and control system for a locomotive comprising traction motors, motor excitation reducing means, a power plant, power plant speed, load and output regulating means including overriding means to reduce the output of said power plant, power connections including switching means for causing transition of the motor power connections between different power circuit relations with said power plant, interlocking, control, and train line connections between said motor excitation reducing means, said overriding means, and said switching means to cause combined and sequential operation thereof for causing a reduction in the output of said power plant during transition of the motor circuit relations and a reduction in the motor excitation for each circuit relation, said interlocking, control and train line control connections including a manually operable master power controller for said regulating means, a manually operable master transition controller and automatic transition control means responsive to electrical conditions in each of the motor power circuit relations for said switching means and a selector switch for rendering either said transition controller or the automatic transition control means effective and the manual transition controller effective to forestall certain operation of said switching means by said automatic means.

7. A generating electric traction and control system for a locomotive comprising a power plant comprising a prime mover and electric generator, power plant speed, load and power output regulating means including generator excitation varying means, traction motors for driving the locomotive, motor field shunting means, a plurality of switching means included in said power circuit for causing transition of said motor power circuit relations with respect to said generator and for shunting said motor fields for each circuit relation, a manually operable master power controller for said power plant regulating means, a manually operable master transition controller and automatic transition control means for said switching means and a manually operable selector switch for rendering said transition controller solely effective or effective in combination with said automatic transition control means to forestall certain control action thereby, said automatic transition control means being responsive to variation in electrical control conditions in each of said motor circuit relations, said power plant regulating means, said motor field shunting means, said master controllers, said automatic transition control means and said switch being connected in a control circuit including train line conductors to cause combined and sequential operation of said switching means for causing a reduction in the generator excitation and output upon transition of said motor circuit relations and shunting of said motor fields for each circuit relation in response to operation of said master transition controller or automatic transition control means if not forestalled by operation of said selector switch and master transition controller, said train line control conductors serving to connect similar regulating and switching means and control apparatus on other locomotives for multiple control and operation therewith.

8. A generating electric traction and control system comprising a power plant including a prime mover, an electric generator driven thereby, speed, load and output varying means for said power plant responsive to the speed thereof, electric traction motors, field shunting means for said motors, a power circuit between said generator and said motors including switching means for transferring the motor circuit relations and for shunting the motor fields, interlocking and control means and connections between said power plant speed, load and output varying means and said switching means for causing combined and sequential operation thereof for transferring the motor circuit connections and for reducing the output of the power plant during transfer of the motor circuit connections and also for shunting the motor fields prior to and after transfer of the circuit connections, manually operable control means and automatic control means for controlling the combined and sequential operation of said switching means, and means operable manually to render said automatic control means and said manual means effective in combination for forestalling certain of the combined and sequential operations of said switching means in response to action of said automatic means, and for rendering only said manually operable means effective, said automatic control means acting in response to electrical variations in each of said motor circuit relations with and without the fields of said motors shunted.

9. A generating electric traction and control system comprising a power plant including a prime mover, an electric generator driven thereby, speed, load and output varying means for said power plant responsive to the speed thereof, electric traction motors, field shunting means for said motors, a power circuit between said generaator and said motors including switching means for transferring the motor circuit relations and for shunting the motor fields, interlocking and control means and connections between said power plant speed, load and output varying means and said switching means for causing combined and sequential operation thereof for transferring the motor circuit connections and for reducing the output of the power plant during transfer of the motor circuit connections and also for shunting the motor fields prior to and after transfer of the circuit connections, manually operable control means and automatic control means for controlling the combined and sequential operation of said switching means, and means operable manually to render said automatic control means and said manual means effective in combination for forestalling certain of the combined and sequential operations of said switching means in response to action of said automatic means, and for rendering only said manually operable means effective, said automatic control means acting in response to electrical variations in each of said motor circuit relations with and without the fields of said motors shunted, said manual control means having train line and control connections connected thereto for controlling other similar switching means in multiple.

10. In a generating electric traction system for a locomotive, an engine, an electric generator driven thereby, excitation varying means for said generator, engine speed responsive means for controlling the speed of said engine and generator excitation varying means, means for varying the response of said speed responsive means for causing said engine and generator to operate at any one of a plurality of constant values of speed, load and output, a manually operable master power controller for controlling said speed response varying means, means for overriding control of said speed response varying means by said power controller to cause a reduction in the output of the engine and generator, a plurality of traction motors for driving the locomotive, a power circuit between the generator and motors including switching means for transferring groups of motors between series and parallel circuit relations with the generator and for shunting the motor fields to establish series shunt and parallel shunt motor circuit relations, interlocking and control means and connections between said switching means and said overriding means for causing combined and sequential operation of said switching means for causing operation of said overriding means during transition of the motor connections, a manually operable master transition controller and automatic transition control means included in said interlocking and control means and connections for controlling the combined and sequential operation of said switching means, said automatic transition control means acting in response to electrical conditions in each of said motor circuit relations, and a manual switch also included in said interlocking and control means and connections for rendering only said master transition controller effective or for rendering said automatic transition control means effective and said master transition controller effective to forestall operation of said switching means by said automatic means in response to electrical conditions in certain of said motor circuit relations.

11. In a generating electric traction system for a locomotive, an engine, an electric generator driven thereby, excitation varying means for said generator, engine speed responsive means for controlling the speed of said engine and generator excitation varying means, means for varying the response of said speed responsive means for causing said engine and generator to operate at any one of a plurality of constant values of speed, load and output, a manually operable master power controller for controlling said speed response varying means, means for overriding control of said speed response varying means by said power controller to cause a reduction in the output of the engine and generator, a plurality of traction motors for driving the locomotive, a power circuit between the generator and motors including switching means for transferring groups of motors between series and parallel circuit relations with the generator and for shunting the motor fields to establish series shunt and parallel shunt motor circuit relations, interlocking and control means and connections between said switching means and said overriding means for causing combined and sequential operation of said switching means for causing operation of said overriding means during transition of the motor connections, a manually operable master transition controller and automatic transition control means included in said interlocking and control means and connections for controlling the combined and sequential operation of said switching means, said automatic transition control means acting in response to electrical conditions in each of said motor circuit relations, and a manual switch also included in said interlocking and control means and connections for rendering only said master transition controller effective or for rendering said automatic transition control means effective and said master transition controller effective to forestall operation of said switching means by said automatic means in response to electrical conditions in certain of said motor circuit relations, said master power and transition controllers having train line control connections leading therefrom to control other locomotives having similar manual and/or automatic control means when connected thereto.

12. A generating electric locomotive, a power plant comprising an engine, a generator driven thereby, speed, load and output means for said power plant, a master power controller for said speed, load and output varying means, overriding means for said master power controller for causing a reduction in the power plant output, a plurality of traction motors, power connections between said generator and motors including individual switching means for connecting separate groups of motors in series with said generator, separate switching means for connecting each motor in parallel with said generator and switching means for shunting the motor fields to establish a shunt connection, control and interlocking means and connections between said speed, load and output varying means and said switching means for causing combined and sequential operation of said switching means to cause transfer of the individual motor connections between series, series shunt parallel and parallel shunt circuit relations, the individual motor connections being transferred one at a time between the series shunt and parallel circuit and the overriding means being operated to reduce the power output during this transfer of the individual motor connections, a master transition controller and automatic transition control means for controlling the combined and sequential operation of said switching means, and a selector switch for rendering the master transition controller solely effective or effective in combination with said automatic transition control means to forestall certain combined and sequential operation of said switching means by said automatic means, said automatic control means being responsive to electrical conditions in each of said motor circuit relations.

TORSTEN O. LILLQUIST.

REFERENCES CITED

The following references are of record in the file of this patent:

UNITED STATES PATENTS

| Number | Name | Date |
|---|---|---|
| 1,949,216 | McNairy | Feb. 27, 1934 |
| 2,195,766 | Courcoulas | Apr. 2, 1940 |
| 2,221,584 | King | Nov. 12, 1940 |
| 2,245,083 | Webb et al. | June 10, 1941 |
| 2,266,326 | Lillquist | Dec. 16, 1941 |
| 2,271,984 | McNairy et al. | Feb. 3, 1942 |
| 2,292,203 | Cowin | Aug. 4, 1942 |
| 2,304,937 | Lillquist | Dec. 15, 1942 |
| 2,314,583 | Lillquist | Mar. 23, 1943 |
| 2,365,418 | Lillquist | Dec. 19, 1944 |
| 2,371,832 | Lillquist | Mar. 20, 1945 |
| 2,371,833 | Lillquist | Mar. 20, 1945 |
| 2,431,459 | Bundy | Nov. 25, 1947 |